US006536634B2

(12) United States Patent
Berndorfer et al.

(10) Patent No.: US 6,536,634 B2
(45) Date of Patent: Mar. 25, 2003

(54) FLUID DISPENSING SOLENOID VALVE

(75) Inventors: Axel H Berndorfer, El Paso, TX (US); Ivan Rafael Samalot, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 61 days.

(21) Appl. No.: 09/827,091

(22) Filed: Apr. 5, 2001

(65) Prior Publication Data

US 2002/0148529 A1 Oct. 17, 2002

(51) Int. Cl.[7] .................................................. G01F 11/28
(52) U.S. Cl. ........................ 222/442; 222/449; 222/450; 222/453
(58) Field of Search ......................... 222/442, 448–451, 222/453

(56) References Cited

U.S. PATENT DOCUMENTS

| 2,478,521 A | 8/1949 | Booth et al. ................. 123/196 |
| 2,708,090 A | 5/1955 | MacDougall ................. 251/16 |
| 2,898,902 A | 8/1959 | Vogel .......................... 123/196 |
| 3,073,490 A | 1/1963 | Dahl et al. .................. 222/453 |
| 4,055,281 A | 10/1977 | Rosen et al. ................. 222/309 |
| 5,147,014 A | * 9/1992 | Pederson ................ 123/196 S |

FOREIGN PATENT DOCUMENTS

| EP | 0684368 | 11/1995 |

* cited by examiner

*Primary Examiner*—J. Casimer Jacyna
(74) *Attorney, Agent, or Firm*—Margaret A. Dobrowitsky

(57) ABSTRACT

A fluid dispensing solenoid valve includes a plunger tube that forms an inlet orifice and an outlet orifice. A plunger that forms a fluid chamber is slidably disposed within the plunger tube. The plunger is movable between a fluid fill configuration, wherein the fluid chamber communicates with the inlet orifice to allow the fluid chamber to be filled and a fluid dump configuration, wherein the fluid chamber communicates with the outlet orifice to allow the fluid chamber to be emptied. The fluid dispensing solenoid valve is used to dispense a very accurate quantity of fluid in very controllable manner.

14 Claims, 3 Drawing Sheets

US 6,536,634 B2

FLUID DISPENSING SOLENOID VALVE

TECHNICAL FIELD

The present invention relates generally to solenoids and actuators.

BACKGROUND OF THE INVENTION

Many engine lubrication systems manufactured today include an oil level sensor that senses the level of oil in a reservoir, e.g., an oil pan, that is part of the system. If the oil level in the reservoir falls below a critical level, the operator is advised, e.g., by an indicator light, that oil must be added to the engine lubrication system. Thus, the operator must either add the oil to the engine or have a service technician, e.g., a mechanic, do so.

In addition to the oil level sensor, some engine lubrication systems include an oil condition sensor that senses the condition of the engine oil based on an oil parameter, e.g., oil dielectric constant. If the condition of the oil deteriorates below a predetermined threshold, the operator is instructed, e.g., by an indicator light, to either change the oil or add a chemical additive to the oil in order to enhance the condition of the oil. In either situation, the engine must be temporarily removed from operation so that someone, e.g., a mechanic, can manually service the engine in order to change the engine oil, add fresh oil to the engine oil, or add a chemical additive to the engine oil. To avoid extended down time while the engine is being serviced, an on board system can be used to automatically provide fresh oil or a chemical additive to the lubrication system. Such a system requires a device that can automatically administer a required amount of fresh oil or chemical additive in an accurate and controllable manner.

It happens that fluid dosage devices for automatically dispensing fluid, e.g., oil, have been provided for use in conjunction with two-stroke engines. These devices typically include gear driven pumps that dispense a predetermined dose of oil to the fuel mixture or directly to parts within the engine in need of lubrication, e.g., crank bearings. A crank shaft or transmission shaft are typically used to drive these devices. Thus, as recognized by the present invention, it is difficult to accurately control when the oil is dispensed to the engine. Moreover, the present invention recognizes that it is difficult to accurately control the amount of fluid dispensed.

As such, the present invention has recognized these prior art drawbacks, and has provided the below-disclosed solutions to one or more of the prior art deficiencies.

SUMMARY OF THE INVENTION

A fluid dispensing solenoid valve includes a plunger tube that forms a first inlet orifice and a first outlet orifice. A plunger that forms a fluid chamber is slidably disposed relative to the plunger tube. The plunger is movable between a fluid fill configuration, wherein the fluid chamber communicates with the inlet orifice to allow the fluid chamber to be filled and a fluid dump configuration, wherein the fluid chamber communicates with the outlet orifice to allow the fluid chamber to be emptied.

In a preferred embodiment, the valve includes a source reservoir that is in fluid communication with the inlet orifice. Moreover, the source reservoir communicates with the fluid chamber when the plunger is in the fluid fill configuration. Preferably, the valve also includes a target reservoir that is in fluid communication with the outlet orifice. The target reservoir also communicates with the fluid chamber when the plunger is in the fluid dump configuration.

In a preferred embodiment, the valve includes a coil that surrounds the plunger. The coil is energizable in order to bias the plunger between the fluid fill configuration and the fluid dump configuration. Preferably, the valve includes a housing that surrounds the coil. In one aspect of the present invention, the source reservoir is a stand-alone source reservoir. In another aspect, the source reservoir is an integrally formed source reservoir that is integrally formed with the sensor between the plunger tube and the housing.

Preferably, the plunger tube forms a second outlet orifice and the valve includes a vent tube that is connected to the second outlet orifice. The vent tube allows the fluid chamber to vent as it is filling. The plunger tube also forms a second inlet orifice and the vent tube is also connected to the second inlet orifice to allow the fluid chamber to vent as it is emptying.

Preferably, the fluid dispensing solenoid valve is in fluid communication with an engine oil pan to provide fluid to the engine oil pan when the valve is in the fluid dump configuration. The solenoid valve may also be used to provide fluid to a fluid based transmission or a hydraulic machine.

In yet another aspect of the present invention, a system for dispensing a predetermined quantity of fluid to an engine oil pan includes an engine, an oil pan, and a fluid dispensing solenoid valve in fluid communication with the oil pan. The solenoid valve is energizable to dispense a predetermined quantity of fluid to the oil pan.

The present invention will now be described, by way of example, with reference to the accompanying drawings, in which:

DESCRIPTION OF THE INVENTION

Figure 1:
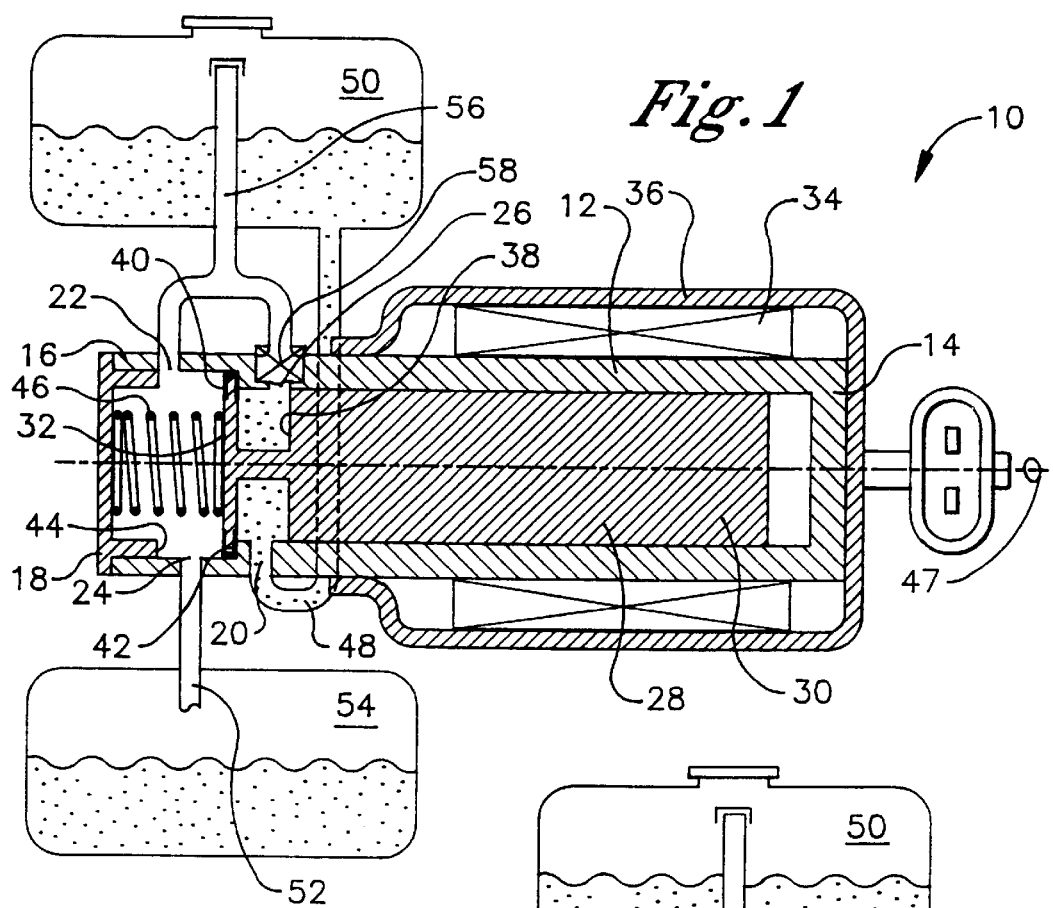
FIG. 1 is a cross-section view of a fluid dispensing solenoid valve in the fluid fill configuration.

Referring initially to FIG. 1, a fluid dispensing solenoid valve is shown and generally designated 10. FIG. 1 shows that the solenoid valve 10 includes a generally cylindrical plunger tube 12 that defines a proximal end 14 and a distal end 16. As shown in FIG. 1, an end cap 18 is preferably press fitted into the distal end 16 of the plunger tube 12. FIG. 1 shows that the plunger tube 12 is formed with a first inlet orifice 20 and a second inlet orifice 22. Moreover, the plunger tube 12 is formed with a first outlet orifice 24 and a second outlet orifice 26.

As shown in FIG. 1, a plunger 28 is disposed within the plunger tube 12. The plunger 28 defines a proximal end 30 and a distal end 32. A hollow, toroidal coil 34 of wire closely surrounds the proximal end 14 of the plunger tube 12 and is magnetically coupled to the proximal end 30 of the plunger 28. A coil housing 36 surrounds and protects the coil 34.

Still referring to FIG. 1, an annular chamber 38 is formed near the distal end 32 of the plunger 28. A seal 40 circumscribes the distal end 32 of the plunger 28. Moreover, the plunger tube 12 forms a first annular seal contact face 42 and the end cap 16 forms a second annular seal contact face 44. As shown in FIG. 1, when the coil 34 is de-energized and the solenoid valve 10 is in the fluid fill configuration, the seal 40 engages the first seal contact face 42 to prevent the annular chamber 38 from leaking.

Figure 2:
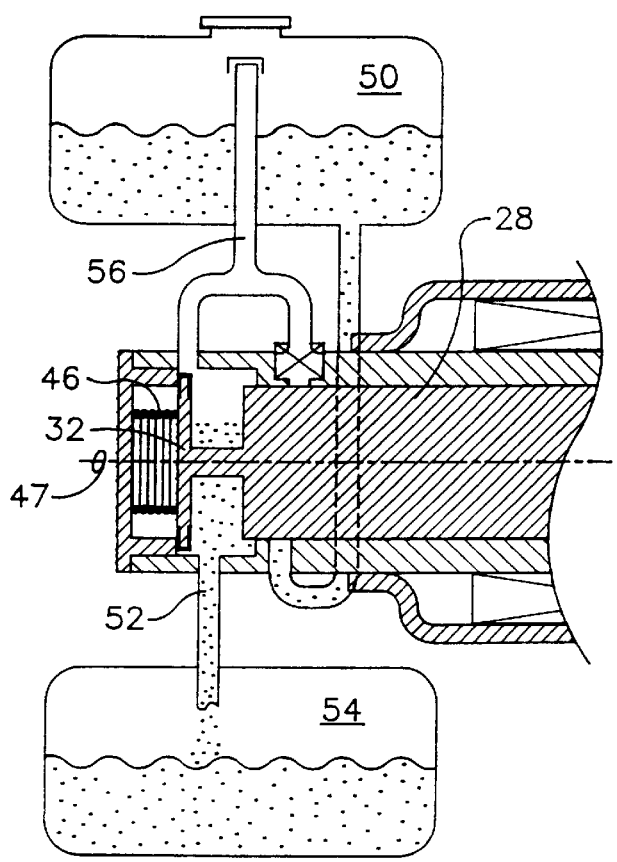
FIG. 2 is a cross-section view of the fluid dispensing solenoid valve in the fluid dump configuration with portions shown in FIG. 1 removed.

As shown in FIG. 1, a spring 46 is installed in compression between the end cap 16 and the distal end 32 of the plunger 28. When the coil 34 is energized, the plunger 28 moves to the left, as shown in FIG. 2, and further compresses the spring 46 until the seal 40 engages the second seal contact face 44. Thus, the solenoid valve 10 is in the fluid dump configuration, as shown. When the coil 34 is de-energized, the spring 46 biases the solenoid valve 10 from the fluid dump configuration to the fluid fill configuration. FIG. 1 shows that the solenoid valve 10 defines a central axis 47. In a preferred embodiment, the solenoid valve 10 is oriented so the central axis 47 is horizontal. It is to be appreciated that the solenoid valve 10 can be configured so that the central axis 47 is vertical.

As further shown in FIG. 1, an inlet tube 48 is connected to the first inlet orifice 20. The inlet tube 48 provides fluid communication between a stand-alone source reservoir 50, placed above the solenoid valve 10, and the annular chamber 38 when the solenoid valve 10 is in the fluid fill configuration. An outlet tube 52 connected to the first outlet orifice 24 provides fluid communication between the annular chamber 38 and a target reservoir 54 when the solenoid valve 10 is in the fluid dump configuration. A vent tube 56 is connected to the second inlet orifice 22 and the second outlet orifice 26 and allows the annular chamber 38 to be vented when being filled or emptied, as described above. A flapper valve 58 is installed between the second outlet orifice 26 and the vent tube 56 to prevent the vent tube 56 from being filled with fluid when the solenoid valve 10 is in the fluid fill configuration.

When the plunger 28 is in the fluid fill configuration, fluid, e.g., oil or an oil additive, flows from the source reservoir 50 through the inlet tube 48 and the first inlet orifice 20 to the annular chamber 38. When the coil 34 is energized, the plunger 28 moves to the fluid dump configuration, as shown in FIG. 2, wherein fluid flows from the annular chamber 38 through the first outlet orifice 24 and the outlet tube 52 to the target reservoir 54. As such, each time the solenoid coil 34 is energized, a predetermined dose of fluid is provided to the target reservoir 54. It is to be appreciated that the volume of fluid provided each time the coil 34 is energized depends on the size of the annular chamber 38. It is also to be appreciated that since the source reservoir 50 is placed above the fluid dispensing solenoid valve 10, the fluid flows from the source reservoir 50 to the annular chamber 38 under the force of gravity.

Figures 3, 4:
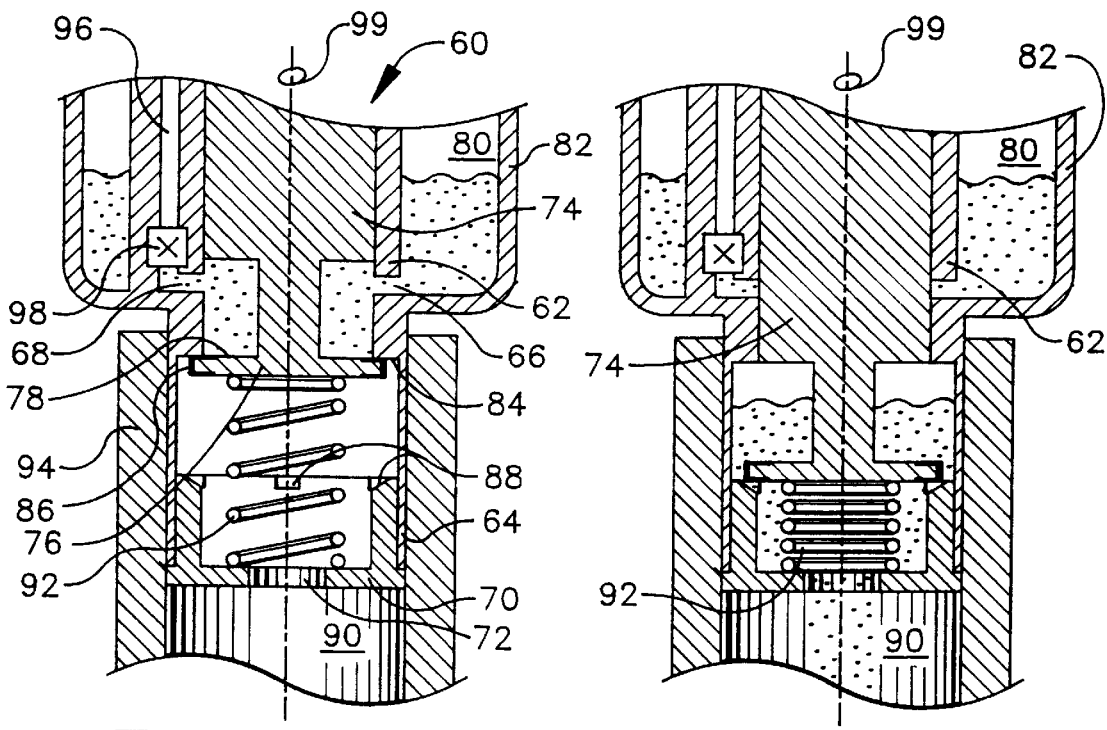
FIG. 3 is a cross-section view of an alternate fluid dispensing solenoid valve in the fluid fill configuration.
FIG. 4 is a cross-section view of an alternate fluid dispensing solenoid valve in the fluid dump configuration.

Referring to FIGS. 3 and 4, an alternative embodiment of the fluid dispensing solenoid valve is shown and generally designated 60. FIG. 3 shows that the solenoid valve 60 includes a plunger tube 62 that defines a distal end 64. As shown, the plunger tube 62 forms an inlet orifice 66 and a first outlet orifice 68. Moreover, an end cap 70 formed with a second outlet orifice 72 is preferably press fitted into the distal end 64 of the plunger tube 62. FIG. 3 shows a plunger 74, that defines a distal end 76, slidably disposed within the plunger tube 62. The plunger 74 forms an annular chamber 78 near its distal end 76. As shown in FIG. 3, a source reservoir 80 is integrally formed between the plunger tube 62 and a housing 82 surrounding the plunger tube 62 such that, as described below, fluid can flow from the source reservoir 80 through the inlet orifice 66 to the annular chamber 78.

The plunger 74 is moveable between a fluid fill configuration, shown in FIG. 3, wherein the annular chamber 78 communicates with the inlet orifice 66 and a fluid dump configuration, shown in FIG. 4, wherein the annular chamber 78 communicates with the outlet orifice 72. As shown in FIG. 3, the plunger tube 62 forms an annular seal contact face 84. A seal 86 circumscribes the distal end 76 of the plunger 74 and when the valve 60 is in the fluid fill configuration, the seal 86 engages the seal contact face 84 to seal the annular fluid chamber.

FIG. 3 shows that the end cap 70 forms at least one, but preferably two plunger stops 88, that are configured to stop the motion of the plunger 74 when the coil (not shown) is energized, but allow fluid to flow from the annular chamber 78 through the second outlet orifice 72 to a target reservoir 90. When the coil is de-energized, a spring 92, installed in compression between the end cap 70 and the distal end 76 of the plunger 74, biases the plunger to the fluid fill configuration.

As shown in FIG. 3, the target reservoir 90 includes an inlet tube 94 into which the distal end 64 of the plunger tube 62 is fitted. A vent tube 96 is connected to the first outlet orifice 68 and allows air within annular chamber to vent as it is filled. A flapper valve 98 is installed in the base of the vent tube 96 to prevent the vent tube 96 from filling with fluid when the plunger 74 is in the fluid fill configuration. FIG. 3 shows that the solenoid valve 60 defines a central axis 99 and the solenoid valve 60 is oriented so the central axis is vertical.

Figure 5:
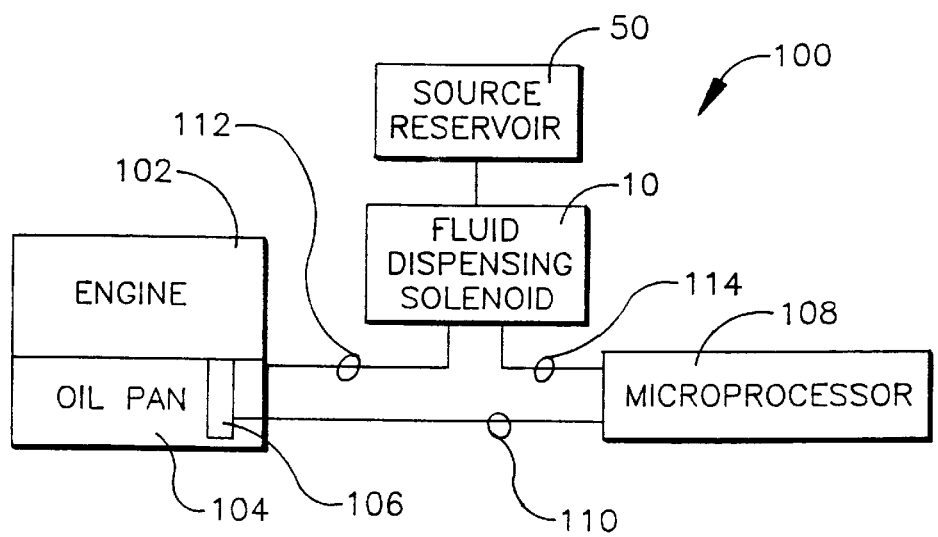
FIG. 5 is a block diagram of an engine lubrication system in which the present invention can be incorporated.

Referring now to FIG. 5, an engine lubrication system is shown and generally designated 100. As shown in FIG. 5, the engine lubrication system 100 includes an engine 102 having an oil pan 104 attached thereto. A sensor 106, e.g., an oil level/condition sensor, is disposed within the oil pan 104 and is used to monitor the level and/or condition of oil within the oil pan 104. FIG. 5 shows that the sensor 106 is connected to a microprocessor 108 via an electrical line 110. The microprocessor 108 uses the sensor 106 to monitor the level and/or condition of oil within the oil pan 104.

As shown in FIG. 5, a fluid dispensing solenoid, e.g., the valve 10 shown in FIGS. 1 and 2, is in fluid communication with the oil pan 104 via fluid line 112. The solenoid valve 10 specifically the coil 34, is also electrically connected to the microprocessor 108 via electrical line 114. When the oil level within the oil pan 104, or the condition thereof, falls below a predetermined minimum threshold as indicated by a signal from the sensor 106, the microprocessor 108 sends a signal to the coil 34 to energize the coil 34 and open the solenoid valve 10 to provide a predetermined dose of fluid, e.g., fresh oil or a chemical additive, from the solenoid valve 10 to the oil pan 104.

FIG. 5 further shows a source reservoir, e.g., the stand-alone source reservoir 50 described in conjunction with the solenoid valve 10 shown in FIGS. 1 and 2, that is fluid communication with the solenoid valve 10 to provide fluid to the fluid dispensing solenoid valve 10 when it is in the fluid fill configuration.

Figure 6:
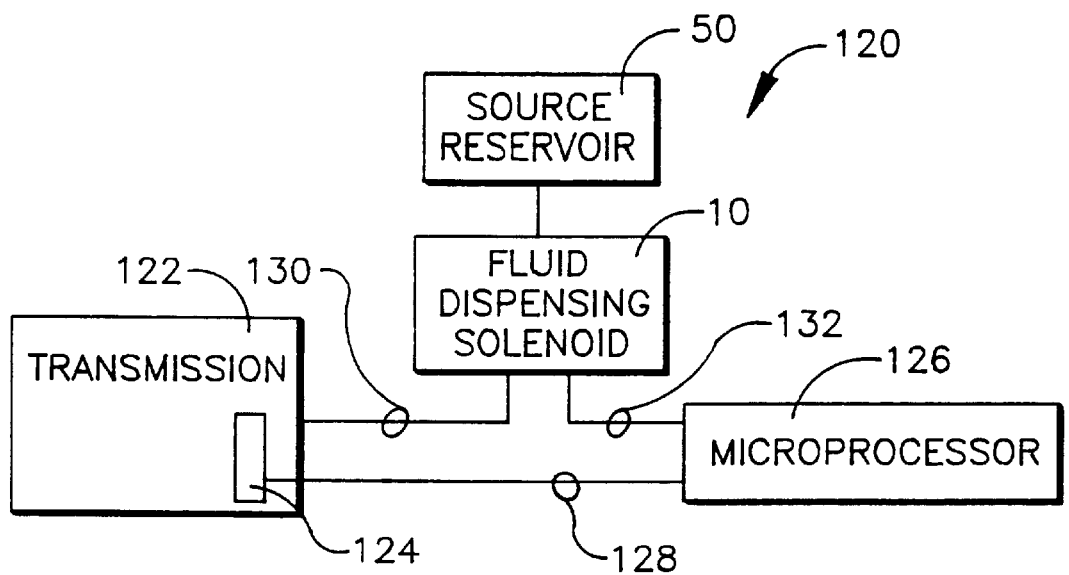
FIG. 6 is a block diagram of a fluid based power transmission system in which the present invention can be incorporated.

Referring to FIG. 6, a fluid based power transmission system is shown and generally designated 120. As shown in FIG. 6, the power transmission system 120 includes a transmission 122 that contains a predetermined quantity of transmission fluid. A sensor 124, e.g., an transmission fluid level/condition sensor, is disposed within the transmission 122 and is used to monitor the level and/or condition of transmission fluid within the transmission 122. FIG. 6 shows that the sensor 124 is connected to a microprocessor 126 via an electrical line 128. The microprocessor 126 uses the sensor 124 to monitor the level and/or condition of transmission fluid within the transmission 122.

As shown in FIG. 6, a fluid dispensing solenoid, e.g., the valve 10 shown in FIGS. 1 and 2, is in fluid communication with the transmission 122 via fluid line 130. The solenoid valve 10 specifically the coil 34, is also electrically connected to the microprocessor 126 via electrical line 132. When the level of transmission fluid within the transmission 122, or the condition thereof, falls below a predetermined minimum threshold as indicated by a signal from the sensor 124, the microprocessor 126 sends a signal to the coil 34 to energize the coil 34 and open the solenoid valve 10 to provide a predetermined dose of fluid, e.g., fresh transmission fluid or a chemical additive, from the solenoid valve 10 to the transmission 122.

FIG. 6 further shows a source reservoir, e.g., the stand-alone source reservoir 50 described in conjunction with the solenoid valve 10 shown in FIGS. 1 and 2, that is fluid communication with the solenoid valve 10 to provide fluid to the fluid dispensing solenoid valve 10 when it is in the fluid fill configuration.

Figure 7:
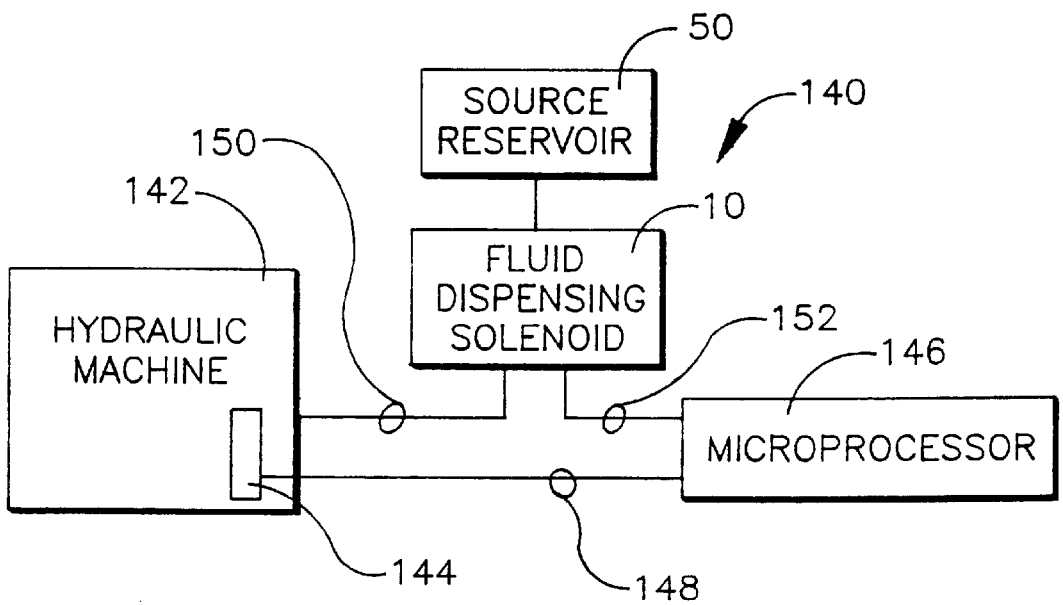
FIG. 7 is a block diagram of a hydraulic machine system in which the present invention can be incorporated.

Referring now to FIG. 7, a hydraulic machine system is shown and generally designated 140. As shown in FIG. 7, the hydraulic machine system 140 includes a hydraulic machine 142, e.g., a hydraulic tool press, that contains a predetermined quantity of hydraulic fluid. A sensor 144, e.g., a hydraulic fluid level/condition sensor, is disposed within the hydraulic machine 142 and is used to monitor the level and/or condition of hydraulic fluid within the hydraulic machine 142. FIG. 7 shows that the sensor 144 is connected to a microprocessor 146 via an electrical line 148. The microprocessor 146 uses the sensor 144 to monitor the level and/or condition of hydraulic fluid within the hydraulic machine 142.

As shown in FIG. 7, a fluid dispensing solenoid, e.g., the valve 10 shown in FIGS. 1 and 2, is in fluid communication with the hydraulic machine 142 via fluid line 150. The solenoid valve 10 specifically the coil 34, is also electrically connected to the microprocessor 146 via electrical line 152. When the level of hydraulic fluid within the hydraulic machine 142, or the condition thereof, falls below a predetermined minimum threshold as indicated by a signal from the sensor 144, the microprocessor 146 sends a signal to the coil 34 to energize the coil 34 and open the solenoid valve 10 to provide a predetermined dose of fluid, e.g., fresh hydraulic fluid or a chemical additive, from the solenoid valve 10 to the hydraulic machine 142.

FIG. 7 further shows a source reservoir, e.g., the stand-alone source reservoir 50 described in conjunction with the solenoid valve 10 shown in FIGS. 1 and 2, that is fluid communication with the solenoid valve 10 to provide fluid to the fluid dispensing solenoid valve 10 when it is in the fluid fill configuration.

With the configuration of structure and logic described above, it is to be appreciated that the fluid dispensing solenoid valve 10, 60 can be used to relatively accurately control when fluid is dispensed to a target reservoir 54, 90, e.g., an engine oil pan 104. Moreover, the fluid dispensing solenoid valve 10, 60 can be used to relatively accurately control the quantity of fluid dispensed.

While the particular FLUID DISPENSING SOLENOID VALVE as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A fluid dispensing solenoid valve, comprising:
   a plunger tube forming at least a first inlet orifice and at least a first outlet orifice;
   at least a second outlet orifice formed by the plunger tube;
   a plunger slidably disposed relative to the plunger tube, the plunger forming a fluid fill configuration wherein the fluid chamber communicates with the inlet orifice to allow the fluid chamber to be filled and a fluid dump configuration wherein the fluid chamber communicates with the outlet orifice to allow the fluid chamber to be emptied; and
   a vent tube connected to the second outlet orifice, the vent tube allowing the fluid chamber to vent when being filled.

2. The valve of claim 1, further comprising:
   a source reservoir in fluid communication with the inlet orifice, the source reservoir communicating with the fluid chamber when the plunger is in the fluid fill configuration.

3. The valve of claim 2, further comprising:
   a target reservoir in fluid communication with the outlet orifice, the target reservoir communicating with the fluid chamber when the plunger is in the fluid dump configuration.

4. The valve of claim 2, wherein the source reservoir is a stand-alone source reservoir.

5. The valve of claim 1, further comprising:
   a coil surrounding the plunger, the coil being energizable to bias the plunger between the fluid fill configuration and the fluid dump configuration.

6. The valve of claim 5, further comprising:
   a housing surrounding the coil.

7. The valve of claim 1, wherein the valve is in fluid communication with an engine oil pan to provide fluid to the engine oil pan when the valve is in the fluid dump configuration.

8. The valve of claim 1, wherein the valve is in fluid communication with a transmission to provide fluid to the transmission when the valve is in the fluid dump configuration.

9. The valve of claim 1, wherein the valve is in fluid communication with a hydraulic machine to provide fluid to the hydraulic machine when the valve is in the fluid dump configuration.

10. A fluid dispensing solenoid valve, comprising:

a plunger tube;

at least a first inlet orifice formed by the plunger tube;

at least a second inlet orifice formed by the plunger tube;

at least a first outlet orifice formed by the plunger tube;

a plunger slidably disposed relative to the plunger tube, the plunger forming a fluid fill configuration wherein the fluid chamber communicates with the inlet orifice to allow the fluid chamber to be filled and a fluid dump configuration wherein the fluid chamber communicates with the outlet orifice to allow the fluid chamber to be emptied; and a vent tube connected to the second inlet orifice, the vent tube allowing the fluid chamber to vent when being emptied.

11. The valve of claim 10, further comprising:

a source reservoir in fluid communication with the inlet orifice, the source reservoir communicating the fluid chamber when the plunger is in the fluid fill configuration.

12. The valve of claim 11, further comprising:

a target reservoir in fluid communication with the outlet orifice, the target reservoir communicating with the fluid chamber when the plunger is in the fluid dump configuration.

13. The valve of claim 10, further comprising:

a coil surrounding the plunger, the coil being energizable to bias the plunger between the fluid fill configuration and the fluid dump configuration.

14. The valve of claim 13, further comprising:

a housing surrounding the coil.

* * * * *